Dec. 6, 1966    M. O'BRIEN ETAL    3,290,051
PALLET BIN CARRIER
Filed Oct. 15, 1964    2 Sheets-Sheet 1
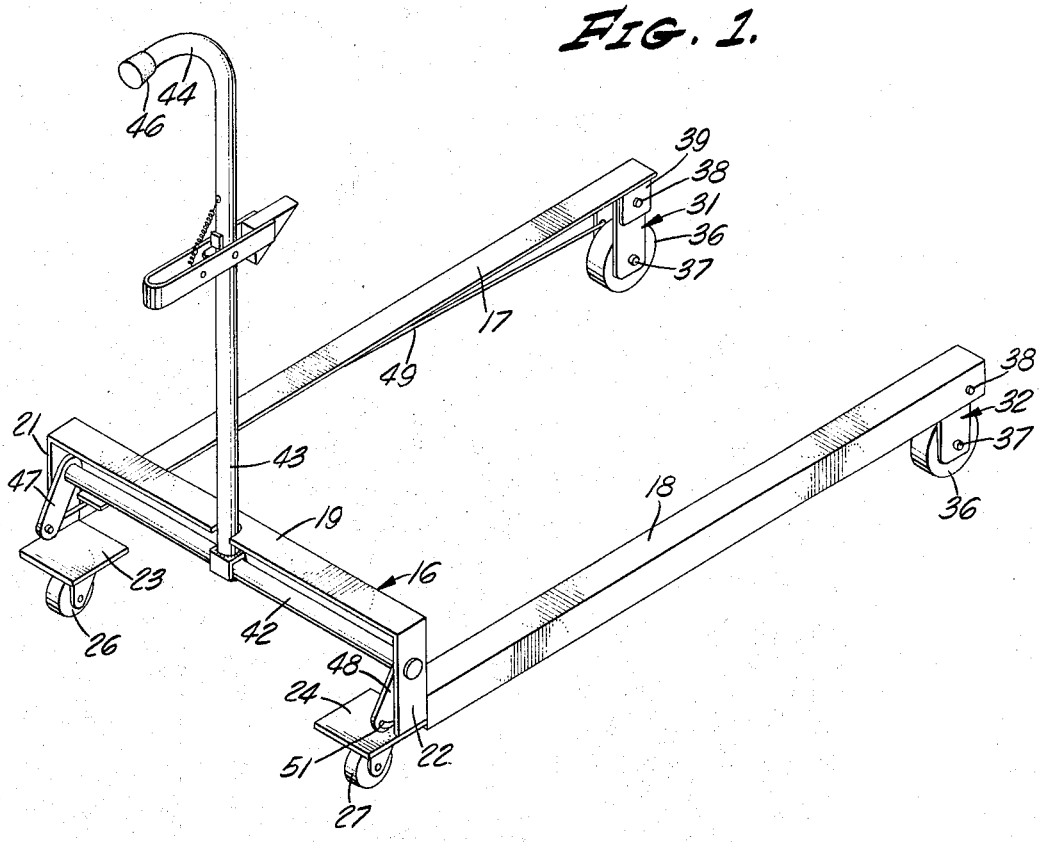
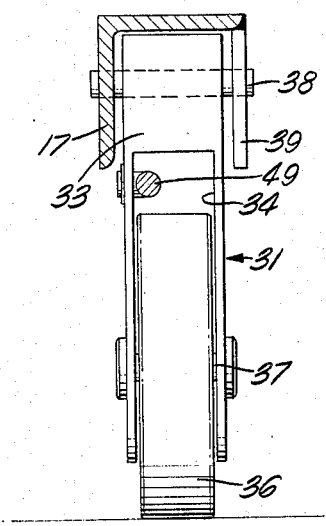
MICHAEL O'BRIEN
DENNIS LEARY, JR.
INVENTORS.
BY *Lothrop & West*
ATTORNEYS

MICHAEL O'BRIEN
DENNIS LEARY, JR.
INVENTORS.

United States Patent Office 3,290,051
Patented Dec. 6, 1966

3,290,051
PALLET BIN CARRIER
Michael O'Brien, Davis, and Dennis Leary, Jr., Ryde, Calif., assignors to The Regents of the University of California, Berkeley, Calif.
Filed Oct. 15, 1964, Ser. No. 404,065
3 Claims. (Cl. 280—43.12)

Our invention relates primarily to means useful in packing houses, shipping departments and the like and particularly for use in moving about pallet bins which are empty and are relatively light, yet which must be disposed in different locations from time to time.

While there are various manual and power devices for use in moving bins about, for example in a packing house, these are usually designed for moving loaded bins and are effective enough for the purpose, but are of considerably greater capacity than is necessary for moving empty bins. Furthermore, the technique of moving an empty bin is often somewhat different from that of moving a loaded bin.

It is therefore an object of the invention to provide a pallet bin carrier which is manually operable and is easily utilized by a single operator for engaging, lifting, transporting and depositing an empty pallet bin or comparable structure.

Another object of the invention is to provide a pallet bin carrier which can easily and inexpensively be made and maintained for use in a packing house or the like for moving about objects of the nature of pallet bins.

Another object of the invention is to provide a pallet bin carrier utilizing effective mechanical leverages to make possible the easy handling of empty pallet bins by an operator, even one of only modest strength.

Another object of the invention is to provide a safe and effective pallet bin carrier.

Another object of the invention is to provide an improved pallet bin carrier.

Other objects together with the foregoing are attained in the embodiment of the invention described in the accompanying descriptions and illustrated in the accompanying drawings, in which:

FIGURE 1 is an isometric view of a pallet bin carrier constructed pursuant to the invention and shown in empty condition;

FIGURE 4 is an enlarged detail shown in cross section, the plane of which is indicated by the line 4—4 of FIGURE 3.

Figure 2:
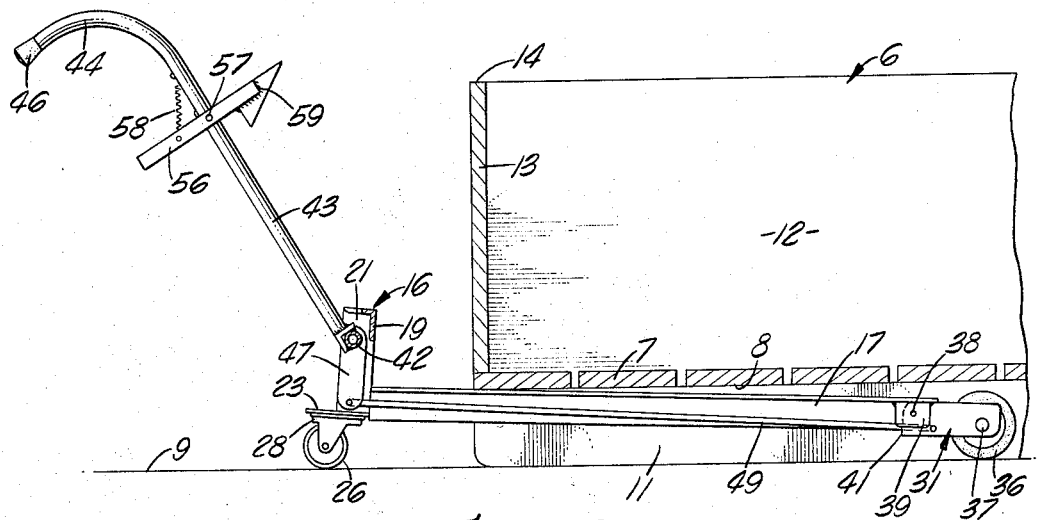
FIGURE 2 is a cross section through a pallet bin carrier pursuant to the invention shown in pallet engaging position and with the plane of section being vertical and just to one side of the center of symmetry of the device.

While the pallet bin carrier pursuant to the invention can be embodied in a number of different ways and can be employed with various different articles, it has commercially been most satisfactorily employed in connection with pallet bins. A pallet bin is a holder largely utilized in fruit and vegetable operations and includes a structure 6 usually of wood having a bottom 7. The lower face 8 of the bottom is a predetermined distance from the floor 9 on which the bin is supported by a pair of side beams 11 spaced apart transversely to leave an intervening opening. The bin also includes the customary side walls 12, a front wall (not shown) and a rear wall 13 having an upper edge 14. When stored, a pallet bin of this sort rests on its beams 11 on the floor 9 with the upper surface 8 of the bin bottom substantially parallel to the floor 9 and spaced therefrom so that handling equipment such as a fork lift truck or the like can be maneuvered thereunder.

Pursuant to the invention, the carrier is inclusive of a carrier frame, generally designated 16, made up of a number of metal shapes primarily angles. The frame includes a pair of side rails 17 and 18 extending fore and aft parallel to each other and at their rearward portions joined to a frame bar 19 having a central section secured to upright end members 21 and 22. These parts are all preferably welded and secured to the rear ends of the side rails 17 and 18.

Also secured to the end members 21 and 22 are rear wheel plates 23 and 24 occupying substantially the same plane and disposed at the rear portions of the side rails to serve as mountings for floor engaging wheels 26 and 27. Although not necessarily so, these wheels preferably are caster wheels each having a turntable 28 mounted to pivot vertically with respect to the plates 23 and 24. The diameter of the wheels 26 and 27 is such that the height of the top of the rearward portion of the side rails 17 and 18; that is, the portion thereof adjacent the frame 19, is slightly more than the predetermined distance from the floor to the lower side 8 of the bin bottom 7.

At the forward end, the side rails 17 and 18 are each provided with one of a pair of substantially identical wheel frames 31 and 32. As particularly shown in FIGURE 4, each of the wheel frames is preferably comprised of a channel 33 having a central cutout portion to provide a slot 34 to receive a floor engaging wheel 36 mounted thereon by means of an axle 37. At the upper end, each of the wheel frames is connected to its respective side rail by means of a mounting pivot 38 passing through the flanges of the channel 33 and also passing through a flange of the side rail and through a lug 39 welded to the side rail and parallel to its flange. In this fashion, the front wheels 36 are made movable in a generally fore and aft direction and in an arcuate fashion about the pivots 38 as an axis, the range of movement being such as to position the wheels 36 far ahead of the mounting pivots 38 as shown in FIGURE 2, or past center and somewhat behind the mounting pivots 38 as shown in FIGURE 3.

In the forward extreme position, illustrated in FIGURE 2, the wheel frames 31 and 32 have their leading edges in abutment with the lower side of the side rail top flanges serving as stops. In the rearward position of the wheels 36, as shown in FIGURE 3, the wheels are stopped by a square edge or corner 41 on the upper rearward corner of each wheel frame 31 and 32 abutting the lower side of the side rail top flange.

Figure 3:
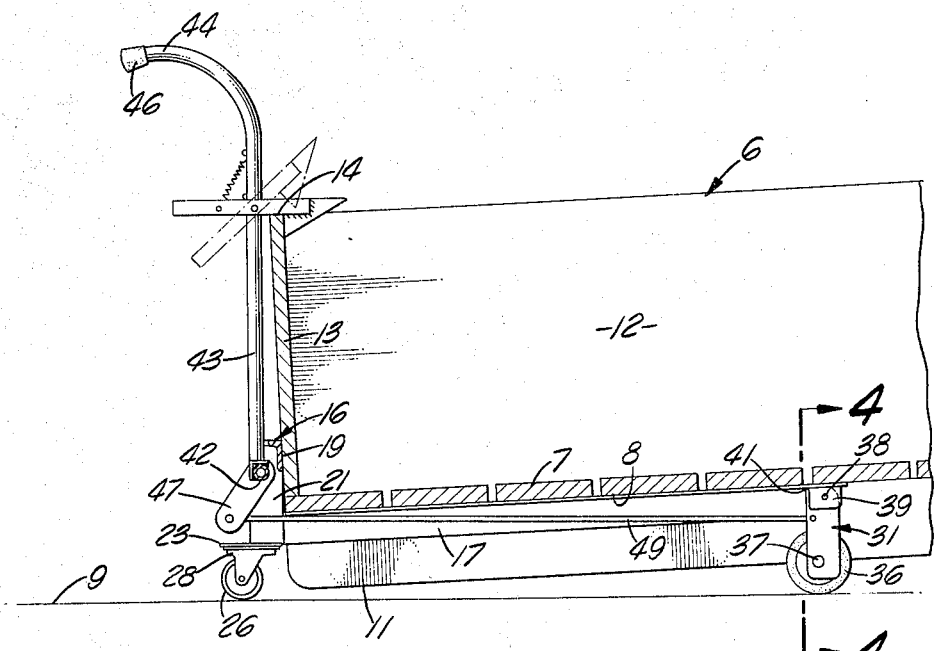
FIGURE 3 is a view comparable to FIGURE 2 and showing the structure in engagement with a bin in elevated carrying position.

The distance between the floor and the lower side 8 of the bin bottom 7 when the front wheel mountings are in the erected, FIGURE 3 position is somewhat greater than the predetermined distance between the bin bottom 7 and the floor 9 when the bin is resting on the floor.

Extending between the end members 21 and 22 of the frame bar 19 is a cross shaft 42 mounted for pivotal rotation in the frame bar and having adjacent its central portion an upstanding operating handle 43. The top of the handle has an upper, rearwardly curved grip 44 ending in a yielding protector 46. The handle 43 is thus mounted on the carrier frame for pivotal movement and to operate the front wheels 36. Provided at the opposite ends of the cross shaft 42 and secured thereto, for example by welding, are arms 47 and 48 to which connecting rods 49 and 51 are pivotally joined. At their forward ends, the connecting rods 49 and 51 are appropriately bent pivotally to engage in the side walls of one of the wheel mounts, as shown in FIGURE 4. In this fashion, a connecting linkage is provided between the handle and both of the forward wheel mounts.

When the handle is swung to one position, as shown in

FIGURE 2, the arms 47 and 48 are moved to displace the connecting rods 49 and 51 and thus to rotate the front wheel mounts into their forward position. This lowers the forward end of the carrier frame so that its over-all height is considerably less than the predetermined distance between the floor 9 and the lower surface 8 of the bin bottom 7. There is also some effect in slightly lowering the rearward end of the carrier frame because of rotation about the transverse axes of the caster wheels 26 and 27.

In this position of the carrier, the handle 43 and the carrier as a whole can be manually advanced until the carrier is substantially in the position shown in FIGURE 2. In this relationship, the lower edge of the bin bottom is just barely in abutment with the upper surface of the side rails. Additional forward movement of the carrier with respect to the bin serves to cam or wedge the rearward portion of the bin bottom 7 slight farther above the floor 9. The side beams 11 at their rearward ends are lifted slightly off of the floor 9.

This forward movement of the carrier continues until the frame bar 19 is in substantial abutment with the rear wall 13 of the bin 6. At that juncture, forward movement of the carrier is arrested and the operator readily moves the handle 43 into the position shown in FIGURE 4. This handle movement is effective through the arms 47 and 48 and the connecting rods 49 and 51 to rotate the forward wheel mounts until the wheels are brought into their rearmost position as shown in FIGURE 3.

In going to the rearmost position, the wheels have passed slightly over dead center position so that the weight of the bin is upon the supports to hold them in their rearward position. Also, this rearward movement of the forward wheel mounts lifts the bin 6 so that its forward end is considerably above the floor and the same motion increases the clearance between the bin beams 11 and the floor at their rearward ends substantially into the transportation location shown in FIGURE 3.

Particularly to hold the bin in place and as a safety factor to keep the handle in position, the handle is provided with a latch lever 56 inclusive of a loop embracing the upper portion of the handle 43 and secured thereto by a pivot pin 57. A spring 58 engaging the loop and the handle urges the latch lever into an extreme position. A wedge latch 59 is secured to the lever in such a location as to cam over the upper edge 14 of the rear wall 13 of the bin when the operating lever 43 is brought up almost into its FIGURE 3 position. When the handle is in its extreme position as shown in FIGURE 3, the spring 58 is effective to engage the latch 59 with the edge 14 of the bin. This assures the continued stability of the bin and also the continued upright position of the operating lever.

The operator by pushing on the handle 43 can move the empty bin to any desired location, steering it by means of the caster wheels as necessary. If at any time, for example in going down an incline, it is necessary to arrest the motion of the structure, the operator can quickly release the latch lever 56 and permit the handle 43 to swing rearwardly, thus lowering the bin immediately so that friction between the beams 11 and the ground arrests the structure.

When the bin is in its final location, the handle 43 can be unlatched by operation of the lever 56 and can be swung downwardly from its FIGURE 3 position into its FIGURE 2 position, thus lowering the front end of the empty bin to the floor. The rear portion of the bin is still slightly above the floor, but an abrupt withdrawing movement of the carrier not only removes the carrier from beneath the bin, but permits final settlement of the bin with its weight evenly distributed on its two supporting beams 11. The carrier can then be wheeled to a new location for reuse.

What is claimed is:

1. A pallet bin carrier comprising a carrier frame having a pair of side rails and a frame bar extending between the rear ends of said side rails, a pair of rear wheel plates secured respectively to the opposite rear corners of said carrier frame, a pair of caster wheel turntables, means for mounting said turntables to pivot about substantially vertical axes on said rear wheel plates, caster wheels on said turntables, a pair of wheel frames, means for mounting said respective wheel frames on said side rails at the opposite front corners of said carrier frame to pivot about a first transverse axis adjacent the upper end of said wheel frames, wheels mounted on said wheel frames to rotate about a second transverse axis adjacent the other end of said wheel frames, a cross shaft journalled on said frame bar, a pair of arms respectively fixed on and depending from the opposite end portions of said cross shaft, a pair of rods each at one end pivotally engaging the depending end of one of said arms and at the other end pivotally engaging one of said wheel frames at a point thereon between said first and second transverse axes, a handle fixed on and upstanding from said cross shaft in substantially a vertical attitude when said wheel frames are in substantially a vertical attitude, and a latch lever, means for pivoting said latch lever on the upper portion of said handle to project forwardly therefrom, and a latch on the forward portion of said lever and depending therefrom.

2. A pallet bin carrier as in claim 1 in which said latch is disposed a predetermined distance forwardly of said frame bar when said handle is in substantially a vertical attitude.

3. A pallet bin carrier as in claim 1 including interengaging means on said wheels frames and said side rails for preventing movement of said wheel frames about said first axis toward said frame bar beyond a substantially vertical position and locating said handle in substantially a vertical attitude.

References Cited by the Examiner

UNITED STATES PATENTS

| 979,093 | 12/1910 | Porteous | 280—46 |
| 1,280,795 | 10/1918 | Martin | 280—46 |
| 2,502,285 | 3/1950 | Smith et al. | 254—10.2 |
| 3,033,398 | 5/1962 | Carroll | 280—46 X |

FOREIGN PATENTS

| 485,300 | 7/1950 | Italy. |

BENJAMIN HERSH, *Primary Examiner.*

C. C. PARSONS, *Assistant Examiner.*